US009005020B2

(12) United States Patent
Frazin

(10) Patent No.: US 9,005,020 B2
(45) Date of Patent: Apr. 14, 2015

(54) MULTI-ACTION POKER GAME AND METHOD OF CONDUCTING SAME VIA NETWORKED SYSTEMS

(75) Inventor: Timothy M. Frazin, Dallas, TX (US)

(73) Assignee: PAC Gaming LLC, Dallas, TX (US)

( * ) Notice: Subject to any disclaimer, the term of this patent is extended or adjusted under 35 U.S.C. 154(b) by 144 days.

(21) Appl. No.: 13/454,001

(22) Filed: Apr. 23, 2012

(65) Prior Publication Data

US 2013/0281174 A1 Oct. 24, 2013

(51) Int. Cl.
*A63F 13/00* (2014.01)
*G07F 17/32* (2006.01)

(52) U.S. Cl.
CPC .......... *G07F 17/3225* (2013.01); *G07F 17/326* (2013.01); *G07F 17/3293* (2013.01)

(58) Field of Classification Search
CPC ........... A63F 2300/30; A63F 2300/301; A63F 2300/50; A63F 2300/69; G07F 17/3202; G07F 17/3211; G07F 17/322
USPC .................................... 463/13, 25, 30, 31, 42
See application file for complete search history.

(56) References Cited

U.S. PATENT DOCUMENTS

| | | | | |
|---|---|---|---|---|
| 4,041,880 | A | 8/1977 | Schankman | |
| 5,356,140 | A | 10/1994 | Dabrowski et al. | |
| 5,895,047 | A | 4/1999 | Callahan | |
| 6,695,695 | B2 * | 2/2004 | Angel | 463/13 |
| 6,986,514 | B2 | 1/2006 | Snow | |
| 7,306,516 | B2 | 12/2007 | Losilevsky | |
| 7,407,163 | B2 | 8/2008 | Snow | |
| 7,744,452 | B2 | 6/2010 | Cimring et al. | |
| 7,764,836 | B2 | 7/2010 | Downs et al. | |
| 7,775,887 | B2 | 8/2010 | Kuhn et al. | |
| 7,976,372 | B2 | 7/2011 | Baerlocher et al. | |
| 8,087,983 | B2 | 1/2012 | Longway | |
| 8,142,271 | B2 | 3/2012 | Kuhn et al. | |
| 8,150,157 | B2 | 4/2012 | Downs et al. | |
| 8,177,628 | B2 | 5/2012 | Manning et al. | |
| 8,251,801 | B2 | 8/2012 | Wadds et al. | |
| 8,262,450 | B1 | 9/2012 | Lubin | |
| 8,287,386 | B2 | 10/2012 | Miller et al. | |
| 8,342,526 | B1 | 1/2013 | Sampson et al. | |
| 8,342,549 | B1 | 1/2013 | Vey | |
| 8,360,844 | B2 | 1/2013 | Schwartz et al. | |
| 2002/0017758 | A1 | 2/2002 | Buono et al. | |
| 2003/0176211 | A1 * | 9/2003 | Sommerville | 463/16 |
| 2006/0084506 | A1 * | 4/2006 | Yoseloff et al. | 463/42 |
| 2006/0189365 | A1 * | 8/2006 | Crawford et al. | 463/13 |
| 2007/0045957 | A1 | 3/2007 | Blair | |
| 2007/0241502 | A1 | 10/2007 | Campbell et al. | |

(Continued)

FOREIGN PATENT DOCUMENTS

| | | |
|---|---|---|
| JP | 2008/526389 | 7/2008 |
| KR | 10/2002/0043487 | 6/2002 |
| WO | WO2005/087331 | 9/2005 |

*Primary Examiner* — James S McClellan
(74) *Attorney, Agent, or Firm* — Greenberg Traurig LLP

(57) ABSTRACT

A multi-action poker game played via a networked system such a server-based system or global computer network (e.g., the Internet). The poker game generally involves players playing two or more independent poker hands substantially simultaneously at the same virtual poker table. The multiple poker hands are distinguished using distinctive playing cards (and/or card placements) and/or poker chip counts or by multiple representations of the same virtual poker table. Alternatively, a single chip count may be used for each of the at least than two hands.

8 Claims, 10 Drawing Sheets

(56) References Cited

U.S. PATENT DOCUMENTS

2008/0194308 A1 8/2008 Falciglia
2009/0029756 A1 1/2009 Guest
2010/0001467 A1 1/2010 Behrendsen et al.
2011/0105224 A1 5/2011 Hartmann

* cited by examiner

MULTI-ACTION POKER GAME AND METHOD OF CONDUCTING SAME VIA NETWORKED SYSTEMS

FIELD OF THE INVENTION

The embodiments of the present invention relate to a poker game during which players may play at least two independent poker hands from different decks of cards substantially simultaneously at a same virtual poker table.

BACKGROUND

The popularity of poker has exploded over the last ten years based on, among other things, the Internet. The Internet allows remote players to quickly and easily participate in poker games. The electronic nature of the poker game also allows unique features to be implemented. For example, players may play individual poker games at multiple poker tables simultaneously by moving from table-to-table to make wagers and make game decisions.

Thus, it would be beneficial to develop a new poker game playable via a networked system and designed to provide players of virtual poker the ability to play multiple, independent poker games at the same virtual poker table without having to move from the single virtual poker table. Advantageously, the new poker game playable via a networked system should increase operator revenue as well.

SUMMARY

The embodiments of the present invention are directed to a multi-action poker game played via a networked system such a server-based system or global computer network (e.g., the Internet). One embodiment generally involves players playing two or more independent poker games substantially simultaneously at the same virtual poker table. The multiple poker games are distinguished using distinctive playing cards (or card placements) and/or poker chip counts or by multiple representations of the same virtual poker table. In an alternative embodiment, a single chip count may be used for each of the at least two poker hands.

Thus, according to the embodiments of the present invention, players of virtual poker have the ability to play multiple, independent poker games at the same virtual poker table without having to move from the single virtual poker table. Consequently, the same virtual poker table supports multiple layers of poker games such that when the player joins a virtual poker table, the player is involved in each poker game underway and when the player leaves the virtual poker table, the player leaves each poker game being played simultaneously at the virtual poker table.

Other variations, embodiments and features of the present invention will become evident from the following detailed description, drawings and claims.

DETAILED DESCRIPTION

Figure 1:
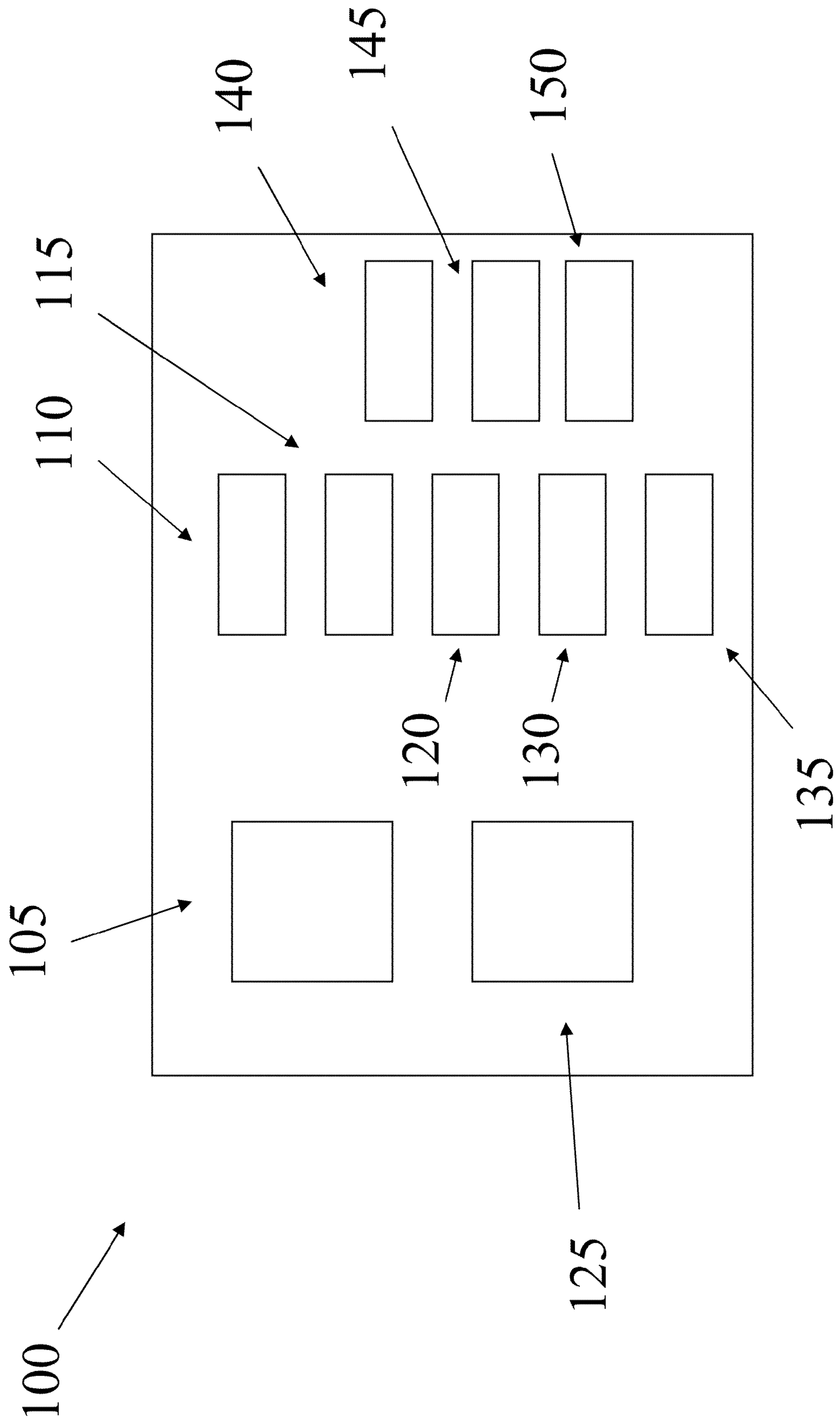
FIG. 1 illustrates a standalone gaming device of the type which may be networked to other gaming devices to form a networked system capable of conducting a poker game according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

The embodiments of the present invention utilize simulated, conventional decks of 52 cards comprising suits of spades, hearts, diamonds and clubs with each suit having thirteen ranked cards comprising ranks 2 through 10, Jacks, Queens, Kings and Aces. Jokers may also be used as additional cards. It is conceivable that other card types and combinations may be used as well.

FIG. 1 shows an electronic gaming device of the type useable to develop a networked system which may facilitate conducting the poker game according to the embodiments of the present invention. A block diagram of the electronic gaming device 100 is shown in FIG. 1. The exemplary electronic gaming device 100 may include a central processing unit (CPU) also deemed a processor 105 which controls the electronic gaming device 100 based on instructions stored in program read-only memory (ROM) 110 and pay table ROM 115. Program ROM 110 stores executable instructions related to the operation of the gaming device and which are generally permanent. CPU 105 may be connected to a video controller 120 which provides output to one or more video displays 125. Similarly, an audio controller 130 provides audio output as dictated by the CPU 105 through speakers 135. The aforementioned components, and others, may be attached to a circuit board forming a motherboard. In another embodiment, the electronic gaming device may linked to a central game server which allows players to select from a number of games via the electronic gaming device 100. In such an embodiment, one or more processors integrated into the central server control the gaming device 100 based on instructions stored in program read-only memory.

A user interface 140 may respond to buttons on button panel or display incorporating touch screen technology or any other devices providing means for users to communicate with, and instruct, the electronic gaming device 100. Wager memory 145 stores an amount of money/credits deposited into the electronic gaming device 100 by a player and specific wager information related to each play of the electronic gaming device 100. Payout system 150 includes a coupon printer or similar device for receiving money/coupon from the electronic gaming device 100.

Figure 2:
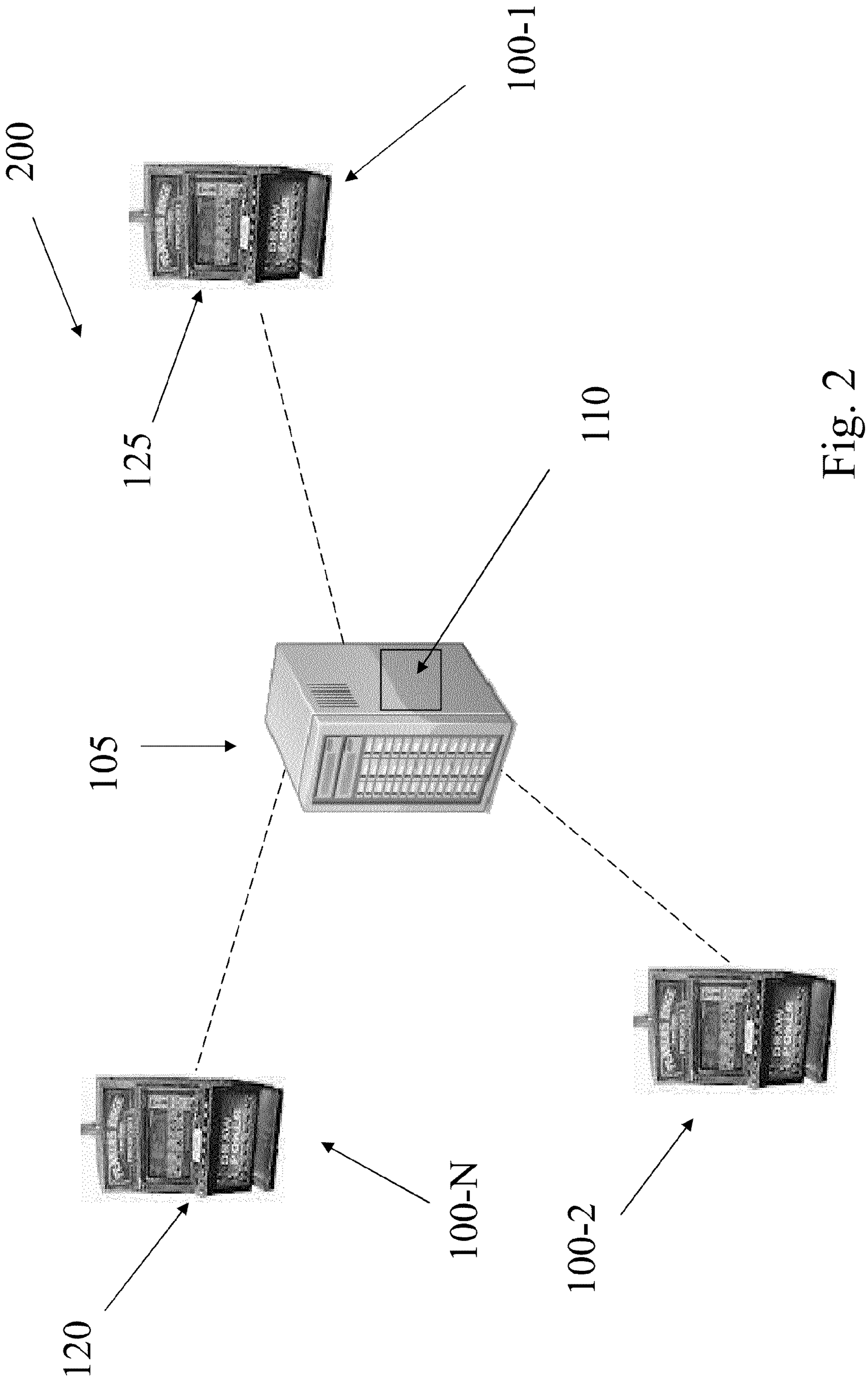
FIG. 2 illustrates a network of gaming devices forming a networked system for conducting a poker game according to the embodiments of the present invention.

Those skilled in the art will recognize that the configuration and features of the electronic gaming device 100 disclosed herein are exemplary and may be altered in any number of ways without impacting the embodiments of the present invention. FIG. 2 shows a network of gaming devices 100-1 through 100-N forming a networked system 200 for conducting a poker game according to the embodiments of the present invention.

Figure 3:
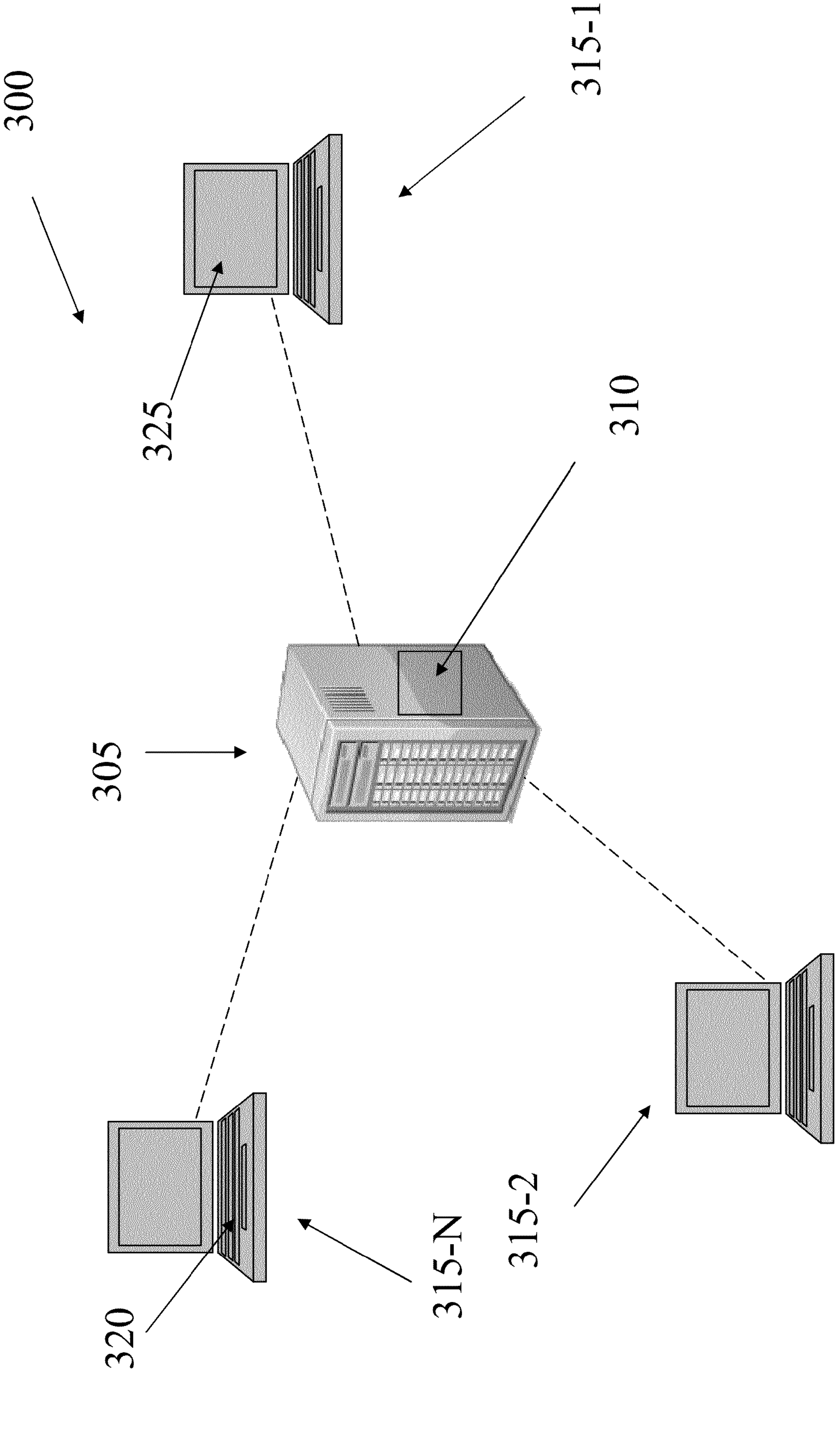
FIG. 3 illustrates a block diagram of a networked online system accessible by mobile devices for conducting a poker game according to the embodiments of the present invention.

FIG. 3 shows a block diagram of a wireless system 300 which may be used to facilitate remote play of the blackjack game according to the embodiments of the present invention. The wireless system 300 comprises a game server 305, including one or more processors 310 running game software, and remote devices 315-1 through 315-N (e.g., smart phones) configured to access said game server 305 facilitating game play on the remote devices 315. The remote devices 315-1 through 315-N download poker software and/or applications to facilitate the play of poker on the remote devices 15-1 through 315-N via said game server 305.

Figure 4:
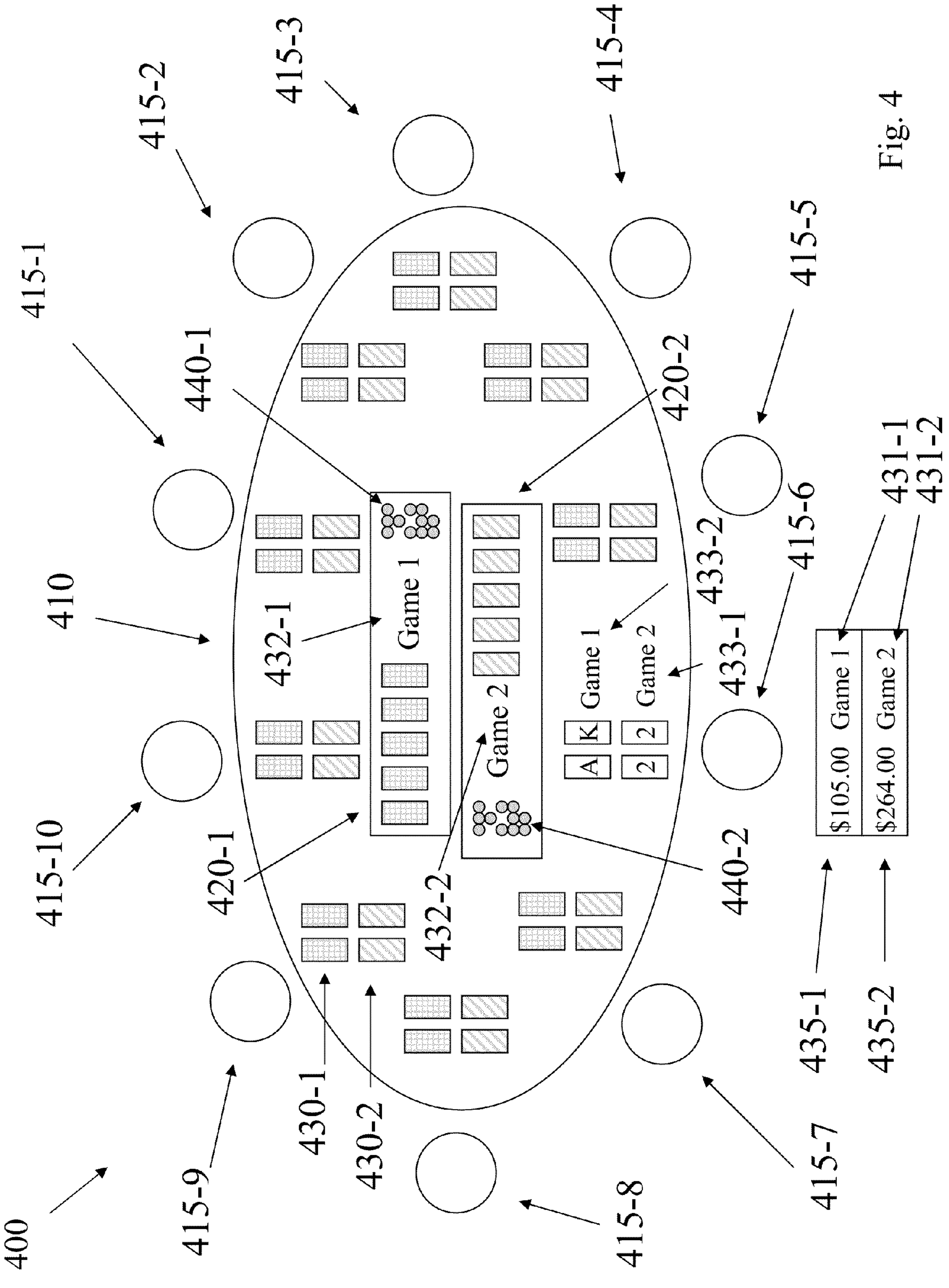
FIG. 4 illustrates a screen shot showing a virtual poker table and distinguished cards of the type which may facilitate the play of a poker game according to the embodiments of the present invention.

FIG. 4 shows a screen shot 400 of a virtual poker table 410, virtual players 415-1 through 415-10, two independent sets of common cards 420-1, 420-2, two independent sets of player hole cards 430-1, 430-2, two independent chip counts 435-1, 435-2 and two pots 440-1, 440-2. As shown, the backs of hole cards 420-1 depict a checkered pattern while the backs of the hole cards 420-2 depict a line pattern. The backs of the common cards 420-1, 420-2 remind players which hole cards 430-1, 430-2 belong to which set of common cards 420-1, 420-2.

To further assist players in maintaining an accurate understanding of which hole cards 430-1, 430-2 belong to which common cards 420-1, 420-2 and which chip counts 435-1, 435-2 and pots 440-1, 440-2 belong to which poker game, hole card game identifiers 431, common card game/pot identifiers 432 and chip count identifiers 433 identify to which game (i.e., Game 1 or Game 2) said hole cards 430-1, 430-2, common cards 420-1, 420-2, pots 440-1, 440-2 and chip counts 435-1, 435-2 belong.

x In a first embodiment, the system automatically deducts wager amounts and credits winning amounts to the correct chip count 435-1, 435-2. Thus, when a player places a wager in Game 1, the system automatically deducts the wager amount from chip count 435-1. Similarly, when a player wins the pot 440-1 in Game 1, the system automatically credits the winning amount to chip count 435-1. Alternatively, a player may be responsible for selecting which chip count 435-1, 435-2 from which to place the wager. In such an embodiment, the system provides an alert to the player responsive to the player selecting the incorrect chip count 435-1, 435-1 from which to make the wager.

Figure 5:
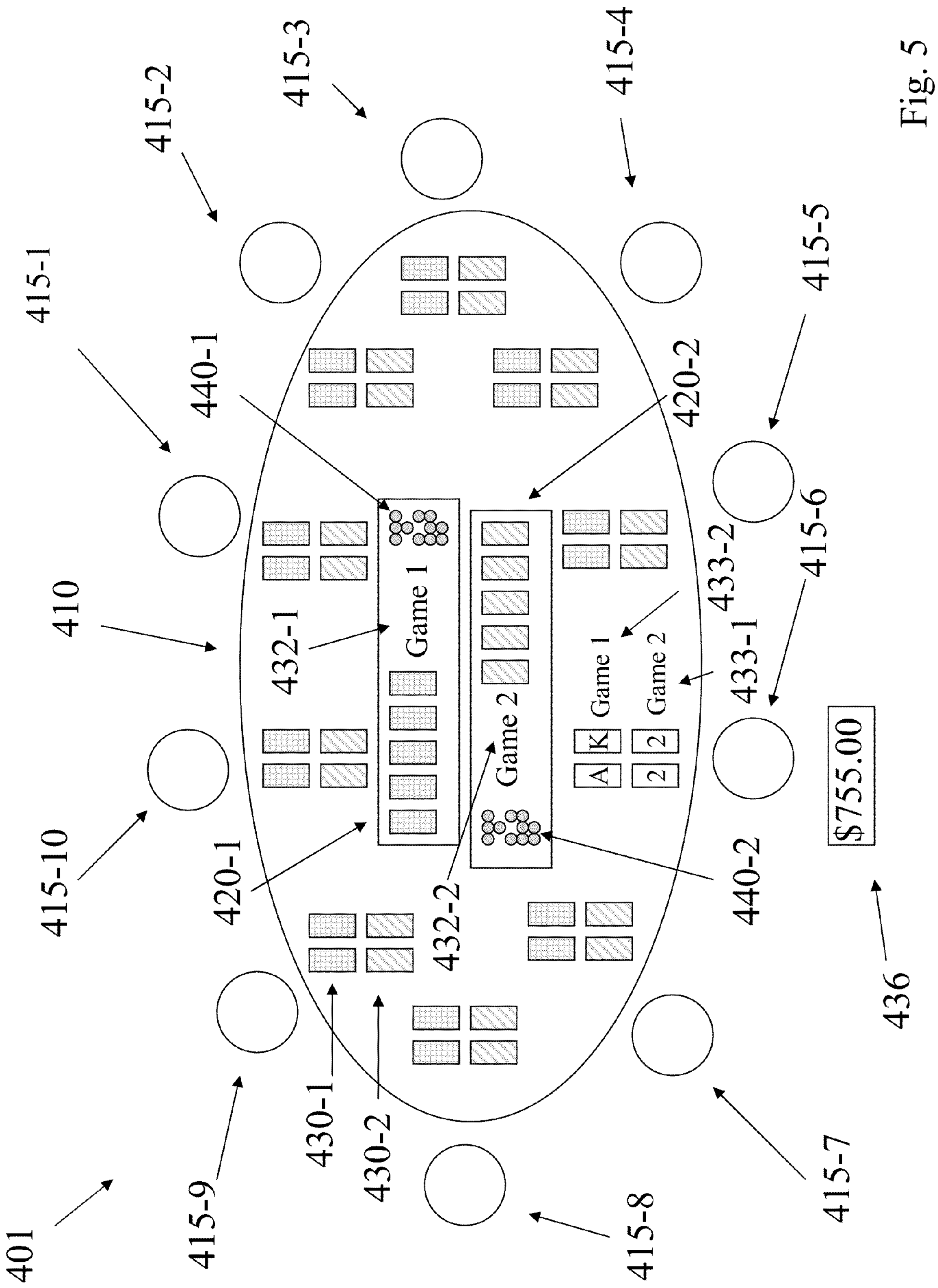
FIG. 5 illustrates a screen shot showing a virtual poker table depicting a single chip count for use with multiple poker games according to the embodiments of the present invention.

In another embodiment, as shown in screen shot 401 of FIG. 5, a single chip count 436 may be used by a player to fund wagers in each of said two or more poker games removing any necessary selection process.

Figure 6:
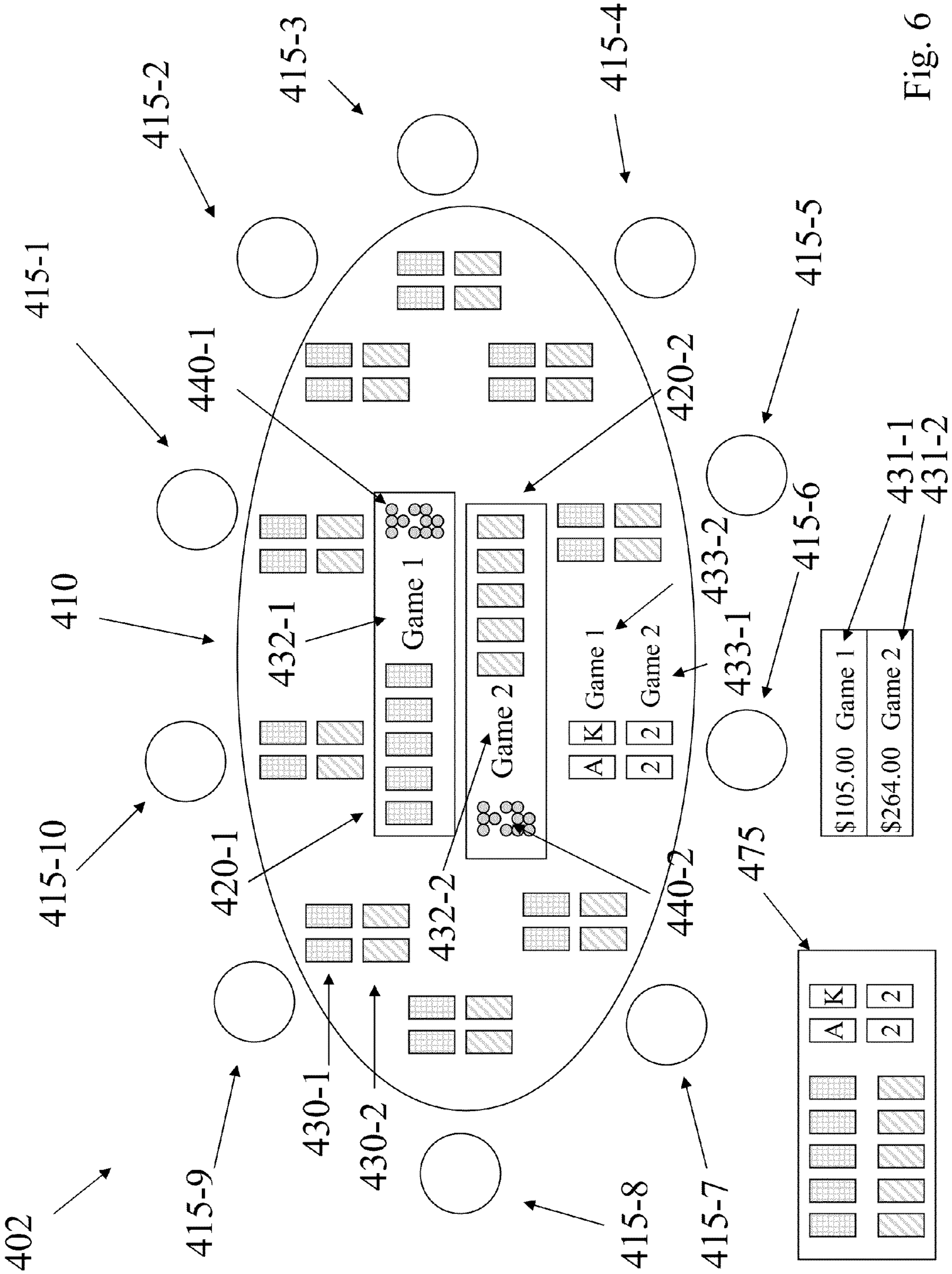
FIG. 6 illustrates a screen shot showing different card placement areas which may facilitate the play of a poker game according to the embodiments of the present invention.

FIG. 6 shows screen shot 402 depicting a separate card placement area 475 for the player to easily determine which hole cards 430-1, 430-2 belong to which set of common cards 420-1, 420-2. Those skilled in the art will recognize that the hole cards 430-1, 430-2 and common cards 420-1, 420-2 may be positioned anywhere to assist players with determining which hole cards 430-1, 430-2 belong to which set of common cards 420-1, 420-2.

As detailed above, the system facilitates the play of two or more poker hands from two or more poker games simultaneously. The play of multiple poker games simultaneously eliminates the need for players to move to a second, independent poker table to play a second poker game.

Figure 7:
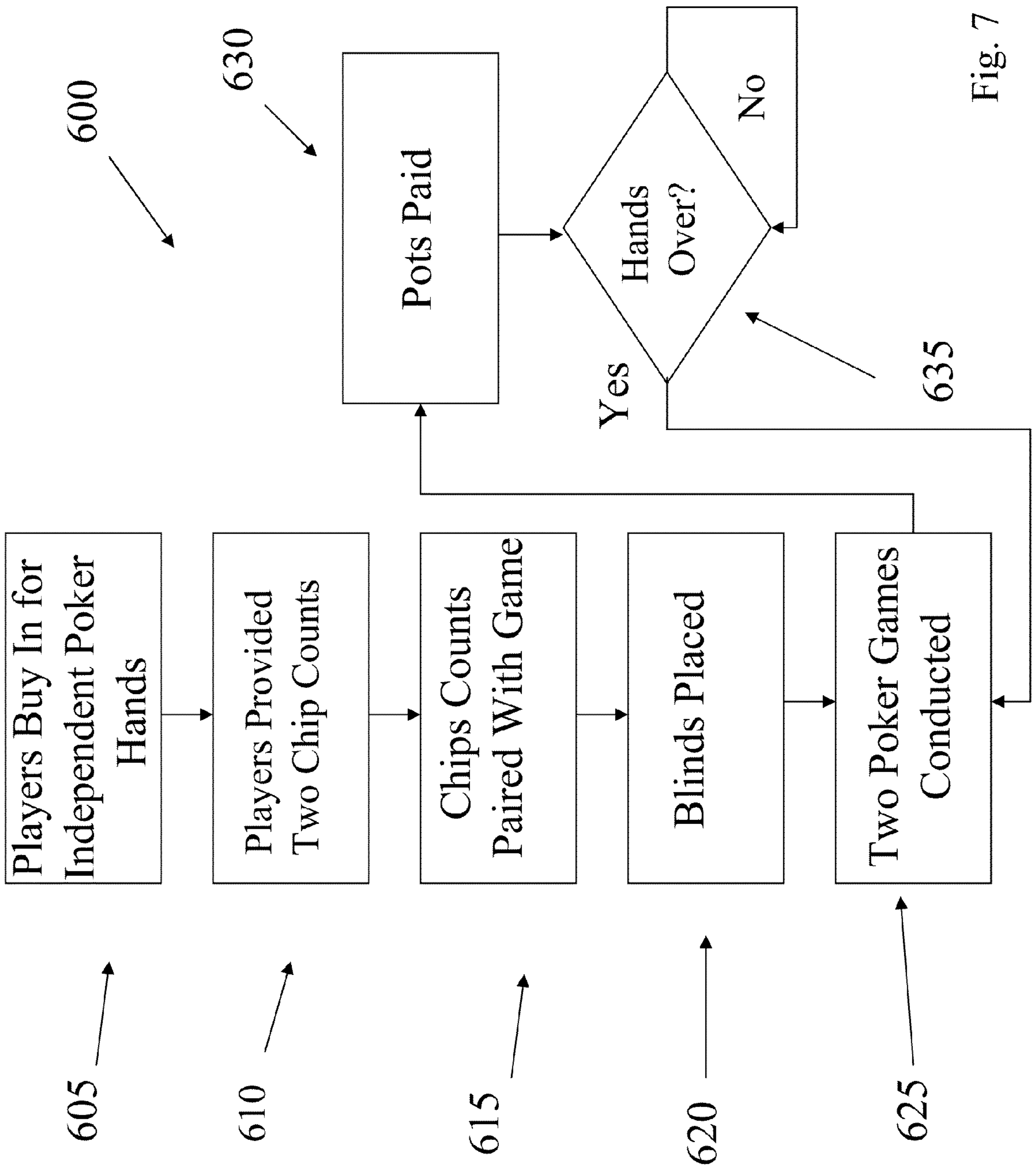
FIG. 7 illustrates a flow chart detailing alternative methods of conducting a poker game according to the embodiments of the present invention.

FIG. 7 shows a flow chart 600 detailing a method of conducting an online poker game according to the embodiments of the present invention played with two poker games simultaneously wherein each poker hand of each poker game begins and no new poker hands begin until both poker hands conclude. At 605, a player buys in to play the poker game by entering an amount of money to be placed into each of two chip counts. When buying in at a virtual poker table, the players are automatically entered into each of the two poker games being played and when they leave the virtual poker table they automatically leave all poker games. At 610, the system displays two chip counts proximate the player. At 615, the system pairs each chip count with the appropriate poker game. At 620, the blinds for each game are placed based on the position of the respective dealer buttons. Each game may have a unique dealer button. For example, a first dealer button may depict "Game 1" thereon while a second dealer button may depict "Game 2" thereon. Alternatively, a single dealer button may be used for both games. At 625, the system conducts the two poker games simultaneously using two independent decks of simulated cards. In one embodiment, the system automatically uses funds from the appropriate chip count to fund the appropriate wagers in the appropriate pot based on the player making a wager. At 630, a pot is paid responsive to a poker hand by crediting the amount of the winning pot into the appropriate chip count of the player(s) winning the hand. At 635, once it is determined that both hands have concluded and the pots have both been paid, the two games begin with new hands being dealt.

Figure 8:
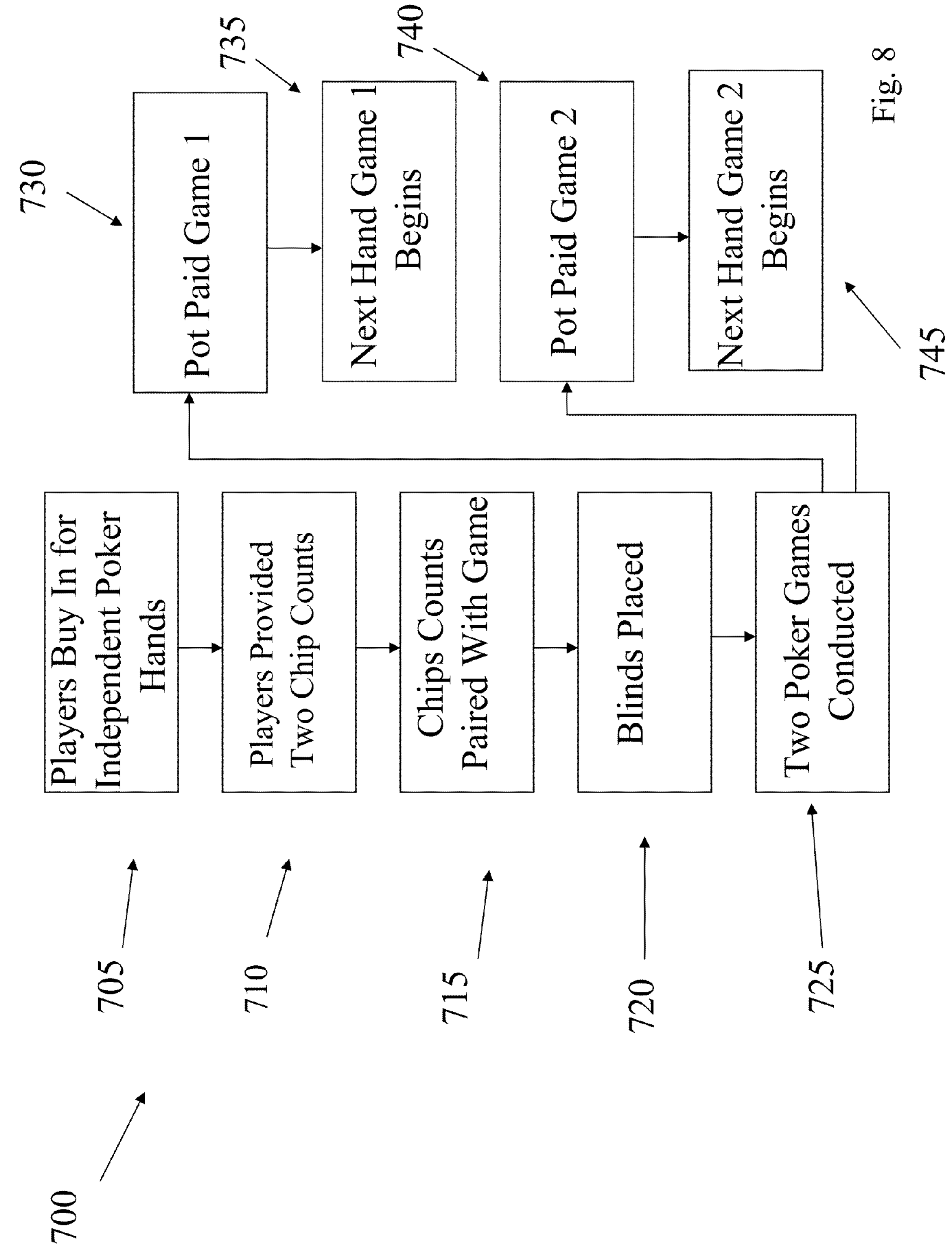
FIG. 8 illustrates a flow chart detailing alternative methods of conducting a poker game according to the embodiments of the present invention

FIG. 8 shows a flow chart 700 detailing a method of conducting an online poker game according to the embodiments of the present invention played with two poker games simultaneously wherein each poker hand begins independent of the other. At 705, a player buys in to play the poker game by entering an amount of money to be placed into each of two chip counts. When buying in at a virtual poker table, the players are automatically entered into each of the two poker games being played and when they leave the virtual poker table they automatically leave all poker games. At 710, the system displays two chip counts proximate the player. At 715, the system pairs each chip count with the appropriate poker game. At 720, the blinds for each game are placed based on the position of the respective dealer buttons. At 725, the system conducts the two poker games simultaneously using two independent decks of simulated cards. In one embodiment, the system automatically uses funds from the appropriate chip count to fund the appropriate wagers in the appropriate pot based on the player making a wager. At 730, a pot is paid responsive to poker hand of poker game 1 by crediting the amount of the winning pot into the chip count of game 1 of the player(s) winning the hand. At 735, a next hand of poker game 1 begins. At 740, a pot is paid responsive to poker hand of poker game 2 by crediting the amount of the winning pot into the chip count of poker game 2 of the player(s) winning the hand. At 745, a next hand of poker game 2 begins.

Figure 9A:
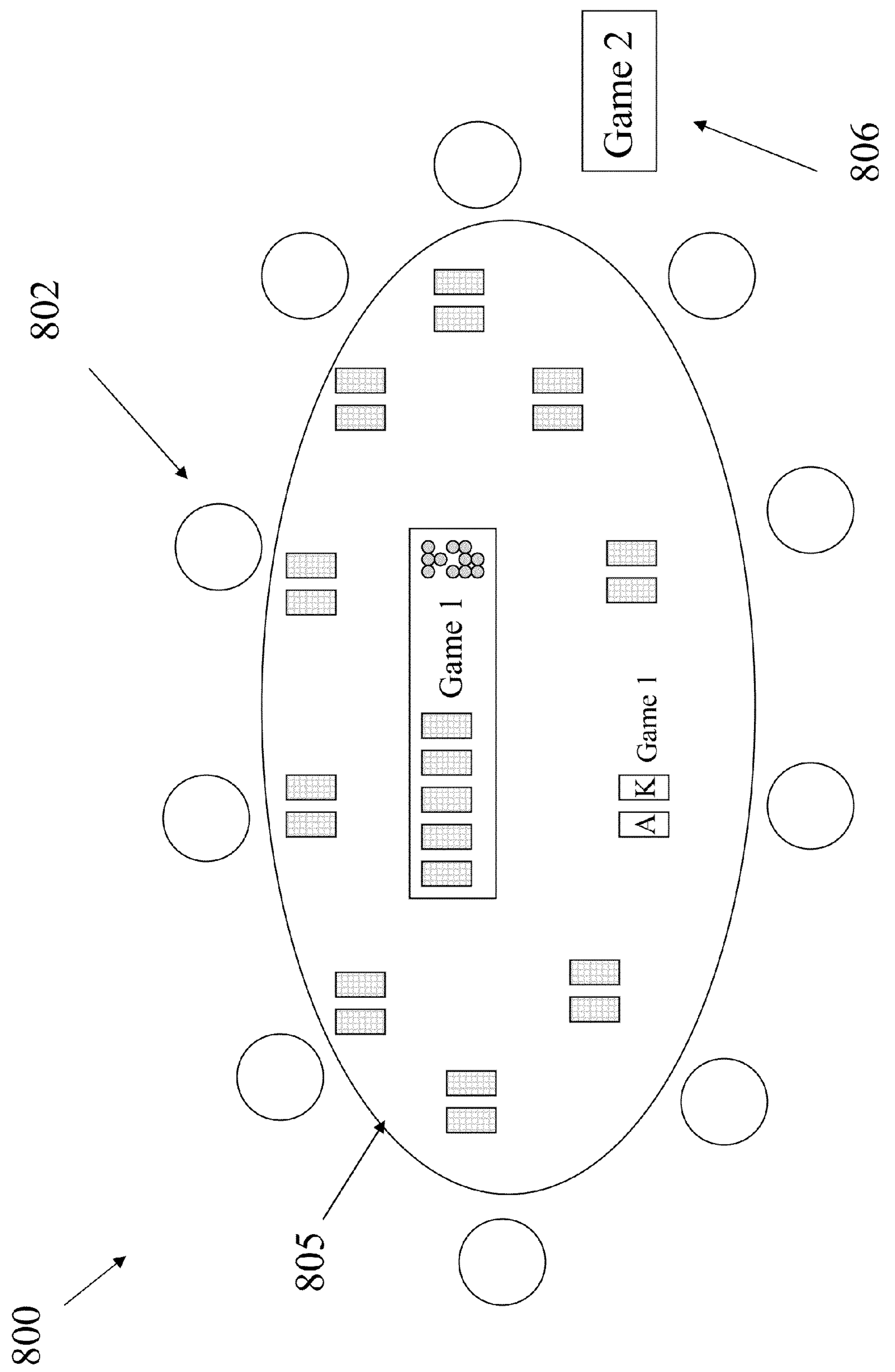
FIGS. 9*a* and 9*b* illustrate a first and second representations of a virtual poker table according to another embodiment of the present invention.
Figure 9B:
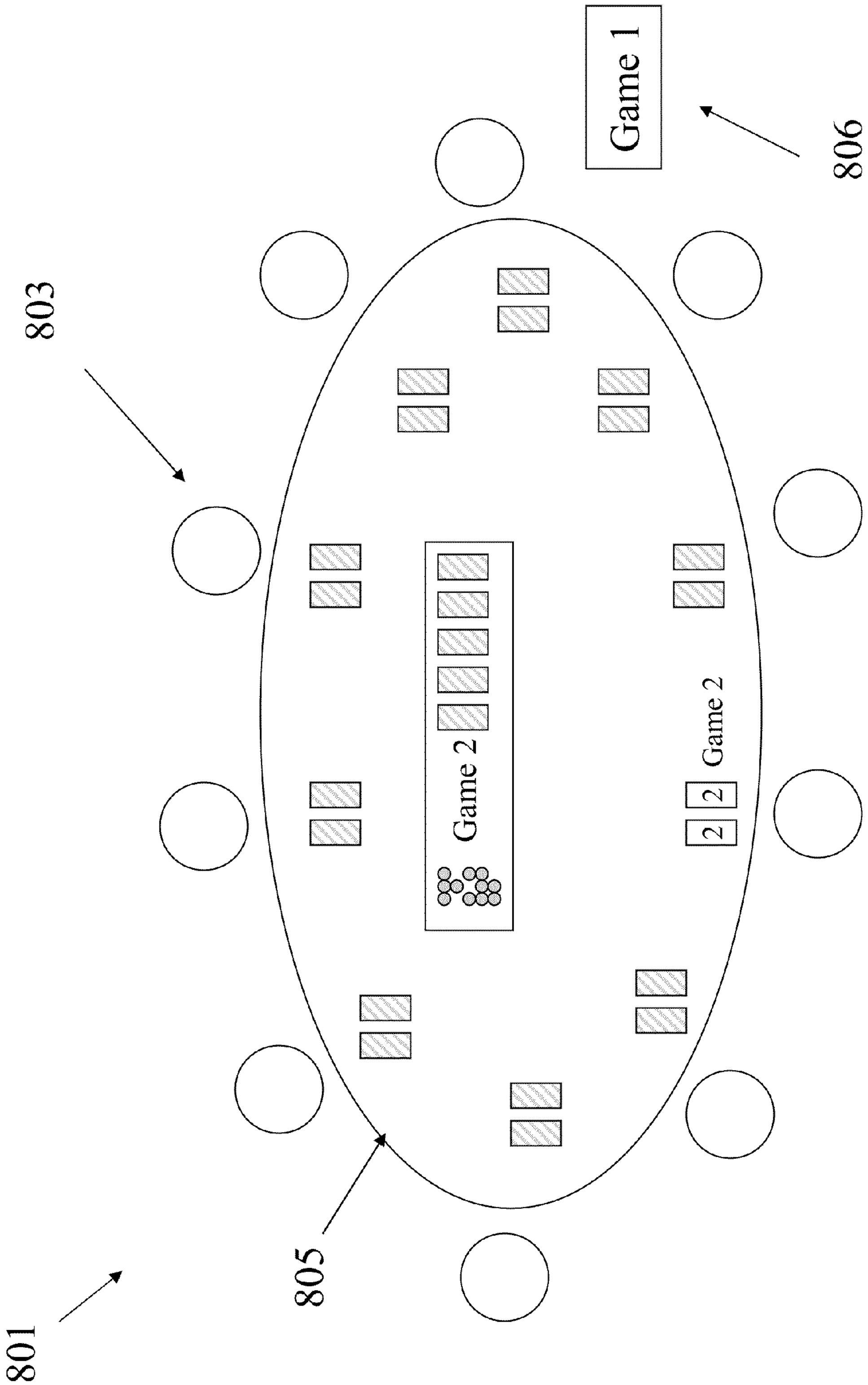

FIGS. 9*a* and 9*b* show screen shots 800 and 801 of multiple poker games individually depicted on multiple layers 802 and 803 of the same virtual poker table 805. In this embodiment, the players move between the different layers at the same virtual poker table 805 whereby the cards of each game are depicted on a different layer 802, 803. FIG. 9*a* shows a first layer 802 attributable to a first poker game and a second layer 803 attributable to a second poker game. Both layers 802, 803 are virtual representations of the same virtual poker table 805. The player may toggle between the layers 802, 803 using a toggle icon 806. With this layered approach, the two or more games need not necessarily use distinctive looking cards since each poker game is depicted on a different layer 802, 803. However, the cards may continue to be distinguished. To keep players informed, the games may continue to be identified by Game 1 and Game 2 designations.

The simultaneous poker games may be directed to cash games or tournaments. Indeed, the simultaneous poker games may lend themselves to interesting tournament scenarios which incorporate success of players in each of the multiple poker hands. Any number of poker games including Texas Hold'em, Omaha and Seven Card Stud, may be played simultaneously according to the embodiments of the present invention.

Although the invention has been described in detail with reference to several embodiments, additional variations and modifications exist within the scope and spirit of the invention as described and defined in the following claims.

I claim:

1. A method comprising:

configuring a game server for communication with multiple remote devices each having at least a user interface and display, said game server configured for:

conducting two or more poker games at a same virtual poker table substantially simultaneously by:

(i) displaying to each player an independent set of hole cards for each of said two or more poker games, each of said independent sets of hole cards provided from a distinct deck of simulated cards;

(ii) displaying a set of independent common cards for each of said two or more poker games, each of said sets of independent common cards provided from a distinct deck of simulated cards;

(iii) providing poker players with independent poker chip sets for each of said two or more independent poker games simultaneously whereby each poker chip set is only useable in one of said two or more poker games;

(iv) accepting wagers using said two independent poker chips sets via a user interface from players during each of said two or more poker games;

(v) segregating wagers into independent pots for each of said two more poker games, each pot formed of chips from one set of said two poker chips sets;

(vi) at the end of each poker hand, paying winning players pots based on outcomes of each of said two or more poker games; and (vii) wherein each of said two or more independent poker games is played at its own pace without regard to the pace of other poker games whereby a new poker hand of each poker game begins when a previous poker hand of said poker game concludes regardless of the state of the poker hands of said other poker games.

2. The method according to claim 1 further comprising displaying independent chip counts for each of said two or more poker games.

3. The method according to claim 1 further comprising debiting wagers automatically utilizing chips from a chip count designated for a corresponding poker game from said two or more poker games.

4. The method according to claim 1 further comprising uniquely identifying on said display poker cards related to each of said two or more poker games.

5. A system comprising:

a game server configured to communicate with remote devices, each remote device including at least a display and user interface; and wherein said game server is configured to:

(i) display to each player an independent set of hole cards for two or more poker games playable at a single virtual poker table substantially simultaneously, each of said independent set of hole cards provided from a distinct deck of simulated cards;

(ii) display a set of independent common cards for each of said two or more poker games, each said set of independent common cards provided from a distinct deck of simulated cards;

(iii) provide poker players with independent poker chip sets for each of said two or more independent poker games simultaneously whereby each poker chip set is only useable in one of said two or more poker games;

(iv) accept wagers using said two independent poker chips sets via a user interface from players during each of said two or more poker games;

(v) segregate wagers into independent pots for each of said two more poker games, each pot formed of chips from one set of said two poker chips sets;

(vi) at the conclusion of each poker hand, pay winning players pots based on outcomes of each of said two or more poker games; and (vii) wherein each of said two or more independent poker games is played at its own pace without regard to the pace of other poker games whereby a new poker hand of each poker game begins when a previous poker hand of said poker game concludes regardless of the state of the poker hands of said other poker games.

6. A method comprising:

configuring a game server for communication with multiple remote devices each having at least a user interface and display, said game server configured for:

conducting two or more independent poker games at a same virtual poker table substantially simultaneously;

conducting each of said two or more independent poker games via a unique layer representing said same virtual poker table whereby the cards of each poker game are depicted on a different layer; and wherein each of said two or more independent poker games is played at its own pace without regard to the pace of other poker games whereby a new poker hand of each poker game begins when a previous poker hand of said poker game concludes regardless of the state of the poker hands of said other poker games.

7. The method of claim 6 further comprising:

(i) displaying to each player an independent set of hole cards for each of said two or more poker games, each of said independent sets of hole cards provided from a distinct deck of simulated cards;

(ii) displaying a set of independent common cards for each of said two or more poker games, each of said sets of independent common cards provided from a distinct deck of simulated cards;

(iii) providing poker players with independent poker chip sets for each of said two or more independent poker games simultaneously whereby each poker chip set is only useable in one of said two or more poker games;

(iv) accepting wagers using said two independent poker chips sets via a user interface from players during each of said two or more poker games;

(v) segregating wagers into independent pots for each of said two more poker games, each pot formed of chips from one set of said two poker chips sets;

(vi) at the end of each poker hand, paying winning players pots based on outcomes of each of said two or more poker games.

8. The method of claim 6 further comprising providing means for players to toggle between unique layers to switch between said two or more poker games.

* * * * *